United States Patent [19]

Lebduska

[11] 4,111,259
[45] Sep. 5, 1978

[54] ENERGY CONSERVATION SYSTEM

[75] Inventor: John Lawrence Lebduska, New City, N.Y.

[73] Assignee: Ecosol, Ltd., New York, N.Y.

[21] Appl. No.: 666,346

[22] Filed: Mar. 12, 1976

[51] Int. Cl.$^2$ ............................................. F24D 3/02
[52] U.S. Cl. ..................... 237/1 A; 62/160; 62/2
[58] Field of Search ............ 62/160, 159, 238, 2; 237/1 A, 2 B

[56] References Cited

U.S. PATENT DOCUMENTS

| | | | |
|---|---|---|---|
| 3,164,969 | 1/1965 | Baker | 62/160 |
| 3,189,085 | 6/1965 | Eberhart | 62/160 |
| 3,378,062 | 4/1968 | Ringquist et al. | 62/159 |
| 3,421,339 | 6/1969 | Volk et al. | 62/159 |
| 3,513,663 | 5/1970 | Martin, Jr. et al. | 62/159 |
| 3,625,022 | 12/1971 | Johnson | 62/159 |
| 3,636,721 | 1/1972 | Rex | 62/159 |
| 3,977,601 | 8/1976 | Bearzi | 237/1 A |
| 3,991,937 | 11/1976 | Heilemann | 237/1 A |
| 3,996,759 | 12/1976 | Meckler | 62/2 |

*Primary Examiner*—Charles J. Myhre
*Assistant Examiner*—P. S. Lall
*Attorney, Agent, or Firm*—Davis, Hoxie, Faithfull & Hapgood

[57] ABSTRACT

A system for heating or cooling room air and heating hot water including a heat pump having heat exchangers connectable to heated and cooled liquid circulation loops, a tank for thermal energy storage, solar heat collectors, and means to provide supplemental heating of the liquid.

16 Claims, 6 Drawing Figures

ENERGY CONSERVATION SYSTEM

The present invention is concerned with a system for heating or cooling room air and for heating domestic hot water. The system employs solar heat collectors, a heat energy storage unit in the form of a water tank, a heat pump apparatus, a supplemental heat source in the form of a conventional hot water heater, an air heat exchanger to heat or cool room air, means to reject heat to the atmosphere, and control means responsive to sensors for actuating valves and circulation pumps, etc.

The system is designed to use tap water as the heat transfer and storage medium. Automatic drainage of the solar collectors during nights when there is a risk of the collectors freezing obviates the need for antifreeze solutions with their attendant expense, corrosion problems, low specific heat, and potential for contamination of the potable water system.

Although the type of solar collector is not critical to the present invention, the use of collectors in which the heat transfer liquid conduits are surrounded by evacuated space provide the advantages of high thermal efficiency and indifference to the atmospheric ambient temperature and wind conditions because of the virtual lack of conduction or convection heat exchange.

In general terms, heat pumps are devices which extract heat energy from one medium and convey that heat energy, at a higher temperature, to another medium. In practical terms, heat pumps are refrigeration units comprising a cold side heat exchanger (evaporator), a hot side exchanger (condenser), a refrigerant such as a fluorinated hydrocarbon, a compressor, and a throttling device. The compressed hot refrigerant vapor is circulated through the condenser to reject heat of vaporization to a first heat transfer medium to liquify the refrigerant which is then throttled to a lower pressure and expanded to a gas in the evaporator which, by extracting heat from a second heat transfer medium, adds the heat of vaporization to the refrigerant which is again cycled through the apparatus. When the first heat transfer medium is outside air and the second medium is inside air, the heat pump acts as an inside air cooler. By reversing the direction of refrigerant flow, inside air is heated and heat energy is extracted from outside ambient air.

The heat pump of the present invention heats or cools room air, but unlike most heat pump units, does not reverse refrigerent flow direction to do so. The evaporator and condenser are in the form of heat exchangers which respectively cool and heat circulating water. The heated or cooled water is routed to a room air heat exchanger such as an air handler including a coil and fan to warm or cool room air.

The heat pump of the present invention eliminates the need for troublesome refrigerant reversal valves, minimizes the usual problems of refrigerant and lubricant migration, and permits more rapid changeover between heating and cooling modes of operation.

The energy expended by a heat pump is directly related to the temperature difference between the media. When used as a means for heating room air, the electrical energy input to operate the compressor is large when the medium from which heat is extracted is cold. A conventional heat pump extracts heat from a medium which is cold outside air or groundwater, whereas in the present system, the medium is warm water heated primarily by solar energy. Thus, the heat pump of the present system ordinarily extracts heat from a medium at a temperature higher than that of the ambient air for a considerable reduction in electrical energy input.

In accordance with the system of the present invention, heating is accomplished by three modes depending upon weather conditions, the energy stored, and the heat demand. Direct circulation of water heated by the solar collector to the room air heat exchanger or air handler constitutes the first mode which is useable when there is sufficient solar insolation to maintain an adequate collector output temperature (165° F.+). In the second mode, applicable under low solar energy input conditions, the heat pump is employed to elevate the temperature of water circulated from the storage tank. In the third mode, applicable when lack of adequate solar radiation persists, a supplemental heater comprising a high heat capacity, but otherwise conventional, domestic hot water heater is employed with a heat exchanger to maintain or raise the storage tank water to an acceptable temperature (50° F.+) to permit economical use of the heat pump operated as in the second mode.

The heating of domestic hot water represents 20 to 35% of the total heat energy expenditure of a typical home. In the present system hot water is available from a heat exchanger when the temperature provided by solar collector output or the heat pump hot side is adequate (165° F.+), or can be provided by the supplemental heat input of the conventional gas, oil, or electric resistance hot water heater.

During hot weather, cooling is accomplished by operating the heat pump to cool water circulated to the air handler and to reject heat to a heat exchanger exterior of the building.

DESCRIPTION OF A PREFERRED EMBODIMENT

The below described embodiment of the system of the present invention is a domestic heating, cooling, and hot water system for a residence of about 1500 square feet of living space on two floors and having in addition a basement. It is located in a moderately cool climate having 4000° to 7500° day heating seasons such as the climatic belt of New York, New Jersey, Pennsylvania, Ohio, Indiana, and Illinois.

Figure 1:
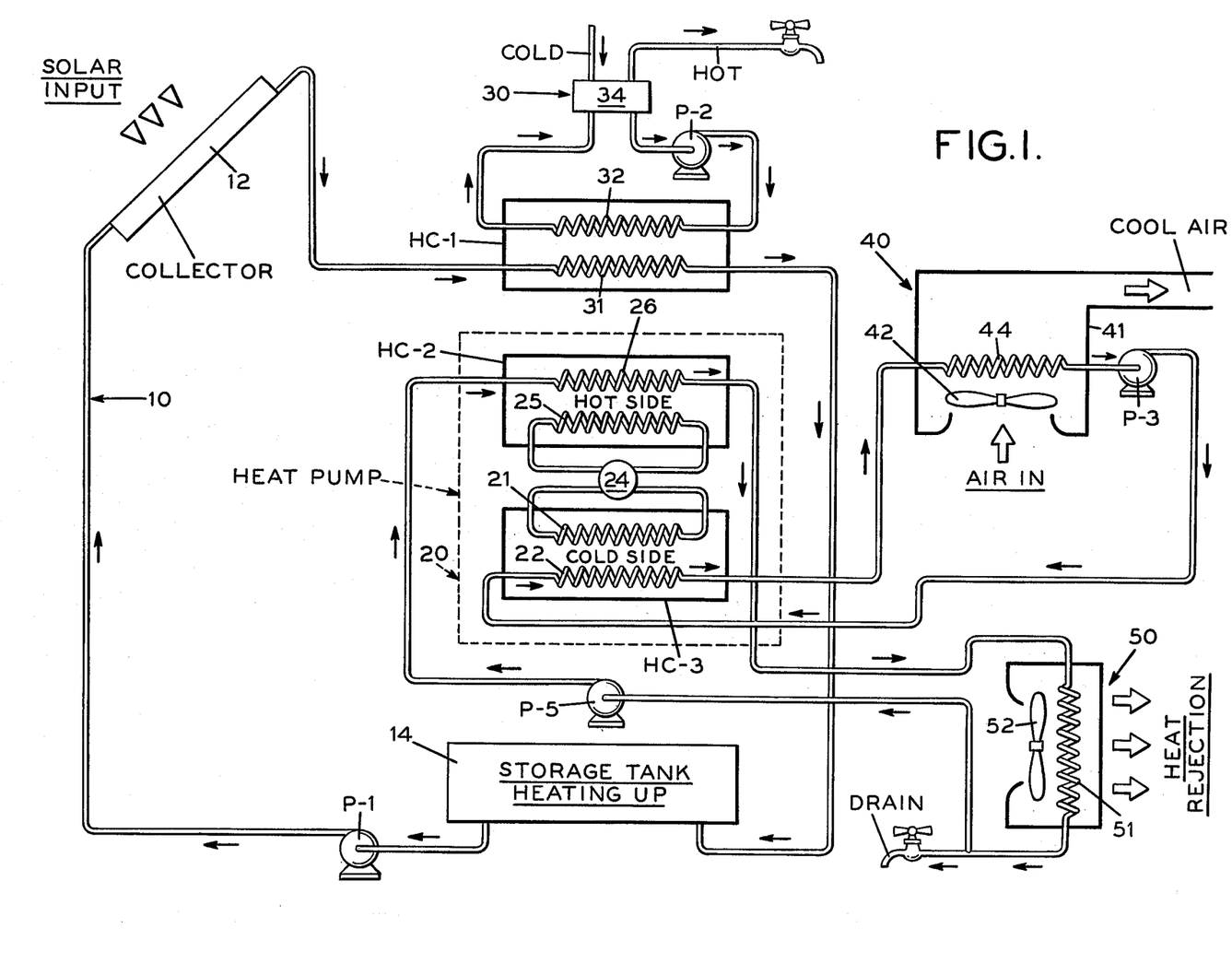
FIG. 1 is a schematic drawing of the system operating to cool room air and heat water on a hot day.

Referring now to FIG. 1, the system of the present invention is schematically depicted operating in a room air cooling and hot water heating mode on a hot, sunny day. The basic components of the system are a solar loop 10, a heat pump apparatus 20, a domestic hot water heater 30, an air handler 40, and an air cooled exterior heat rejector 50.

The solar loop 10 circulates water as the heat transfer medium and includes a roof mounted solar collector 12 such as an Owens - Illinois SUNPAK solar collector, comprising an array of collector elements having an effective area of about 250ft$^2$ wherein there are concentrically arranged an inner feeder tube, an intermediate absorber tube and an outer cover tube. The water to be heated circulates through the feeder and absorber tubes which are surrounded by evacuated space between the absorber and cover tubes to reduce heat losses due to convection, conduction and wind effects. A water to water heat exchanger HC-1 is employed to transfer heat from the solar loop 10 to the domestic hot water system 30. An insulated storage tank 14 of approximately 1000 gallons capacity is located on the lowest level of the residence. A pump P-1 circulates water through the collector 12, heat exchanger HC-1 and tank 14 which together comprise solar loop 10. On a sunny day the collector output temperature can be 165° F. to 180° F. The heat energy not utilized for domestic hot water is stored in tank 14 by raising the temperature of the stored water.

The heat pump apparatus 20 comprises a refrigeration compressor 24, a cold side heat exchanger HC-3 comprising a refrigerant evaporator coil 21 and a cooled water coil 22, and a hot side heat exchanger HC-2 comprising a refrigerant condenser coil 25 and a heated water coil 26. A suitable refrigeration compressor having a cooling capacity of 26,000 BTU/hr is a COPELAWELD model SRM 4 0275 PFV manufactured by Copeland Refrigeration Corporation, Sidney, Ohio. Suitable evaporator and condenser coils and water heat exchangers are manufactured by Edwards Engineering Corporation, Pompton Plains, New Jersey. Other well known components of the heat pump apparatus include inter alia receivers, expansion valves, driers, switches, relays, and refrigerant tubing which are assembled together in a conventional manner. The heat pump of the present system differs from conventional heat pumps in that the change from cooling to heating mode does not involve a reversal of refrigerant flow direction. The output water flow of heat exchangers HC-2 and HC-3 is routed according to whether heating or cooling is desired.

The domestic hot water supply 30 comprises a conventional hot water heater 34 which can be gas or oil fired to be of the electric resistance type. A suitable unit is PEN-80 manufactured by A. O. Smith Corporation, Kankakee, Ill., having a capacity of 80 gallons and a total input capacity of 12 KW/hr. This unit is larger than a 40–52 gallon, 9 KW/hr unit which ordinarily would be chosen for a residence of this size. The domestic hot water system also includes a water to water heat exchanger HC-1 in which the water of the solar loop 10 circulates through coil 31 entirely separate from the coil 32 through which the domestic or potable hot water circulates by means of circulator pump P-2.

The air handler 40 is a conventional plenum 41 and fan 42 and includes a water to air heat exchange coil 44. Suitable air handler components are available from McQuay Division of McQuay-Perfex Inc., Minneapolis, Minn. The air handler 50 has a cooling capacity of about 26,000 BTU/hr with a water input flow rate of 6 GPM and a temperature of 48° F. Water is circulated through coil 44 by means of a circulator pump P-3.

The air cooled heat rejector 50 is a conventional water radiator coil 51 and fan 52 unit such as a SHD-201 manufactured by McQuay. It is located outside the residence. Water from the hot side exchanger HC-2 of the heat pump 20 is circulated through coil 51 by means of a circulator pump P-5. The heat rejector unit 50 must be of a capacity to reject the heat extracted from room air (26,000 BTU/hr) by the coil 44 of the air handler 40 plus some additional heat due to efficiency losses of the system.

The operation of the system in accordance with the schematic drawing of FIG. 1 will now be described. The water is circulated through the solar loop 10 by circulator pump P-1 through the solar collector 12 where it is heated to 165° F. to 180° F. on a sunny day. The heated solar loop water heats domestic hot water by heat exchange between coils 31 and 32 of exchanger HC-1. The domestic hot water is circulated through coil 32 by pump P-2. Since the temperature of the solar loop water is adequately high, supplemental heating of domestic water by heater 34 is not required. The now somewhat cooler solar loop water is cycled to the storage tank 14 where thermal energy is stored. In summer weather, the solar loop serves hot water needs only and also can be used for swimming pool heating.

Room air is cooled in air handler 40 by forcing air over coil 44 with fan 42. Cold water is circulated through coil 44 and coil 22 of heat pump cold side exchanger HC-3 by circulating pump P-3. The water is cooled by heat exchange with the evaporator coil 21 in the cold side exchanger HC-3 of the heat pump 20. The heat absorbed by evaporator coil 21 is rejected from heat pump condenser coil 25 in the hot side exchanger HC-2 of the heat pump. That heat is extracted by circulating water heated in coil 26 of exchanger HC-2 to the exterior heat rejector 50. The hot water is cooled in coil 51 by air flow from fan 52 and is cycled back to the hot side heat exchanger HC-2 by circulator pump P-5. Thus, heat extracted from room air in air handler 40 is ultimately rejected to the exterior by rejector 50. The system operates as a room air cooler using water of the heat transfer medium for both the hot and cold sides of the heat pump. Although the preferred embodiment has been described as using a central air handler, other room heating or cooling means such as pipe arrays in the ceiling, valance loops located near the ceiling, individual fan and coil units for each room, and other liquid circulation heating or cooling means can be used.

Figure 2:
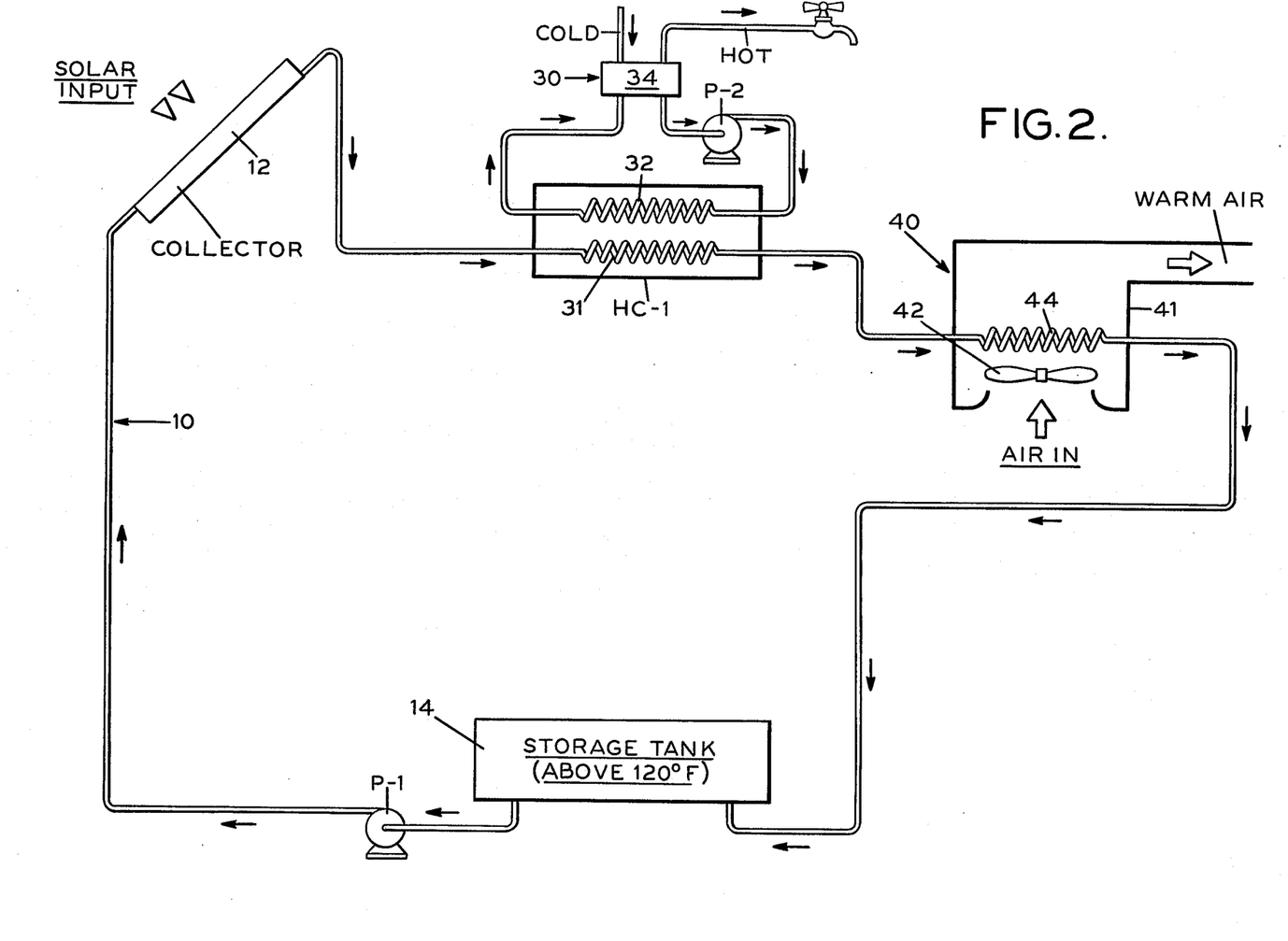
FIG. 2 is a schematic drawing, similar to FIG. 1, showing the operative portions of the system operating to heat water and room air on a sunny, mild day.

FIG. 2 shows the portions of the system which operate on a sunny mild day when room air and hot water heating are required. The only heat input is solar energy extracted by collector 12. Under these weather conditions the temperature of the water in storage tank 14 can be maintained in excess of 120° F. Circulator pump P-1 circulates the water of solar loop 10 through the collector 12 where the temperature is raised to above 165° F. The heated water goes to heat exchanger HC-1 where the heat required for hot water needs is extracted. The solar heated water then circulates through coil 44 of air handler 40 wherein room air is heated. The water of the solar loop returns to the storage tank 14. This mode of operation can continue so long as the heat gained by the solar collector equals or exceeds that required for room air and hot water heating. When the heat requirements exceed the solar input, as at night, the temperature of the water in the storage tank will drop. The quantity of heat stored in the tank 14 is considerable. Each degree F drop in tank storage temperature represents about 8300 BTU. When the temperature in the storage tank exceeds 120° F. at nightfall, heat can be directly extracted until the temperature of the stored water falls below a preselected minimum at which the system begins to operate in a different mode.

Figure 3:
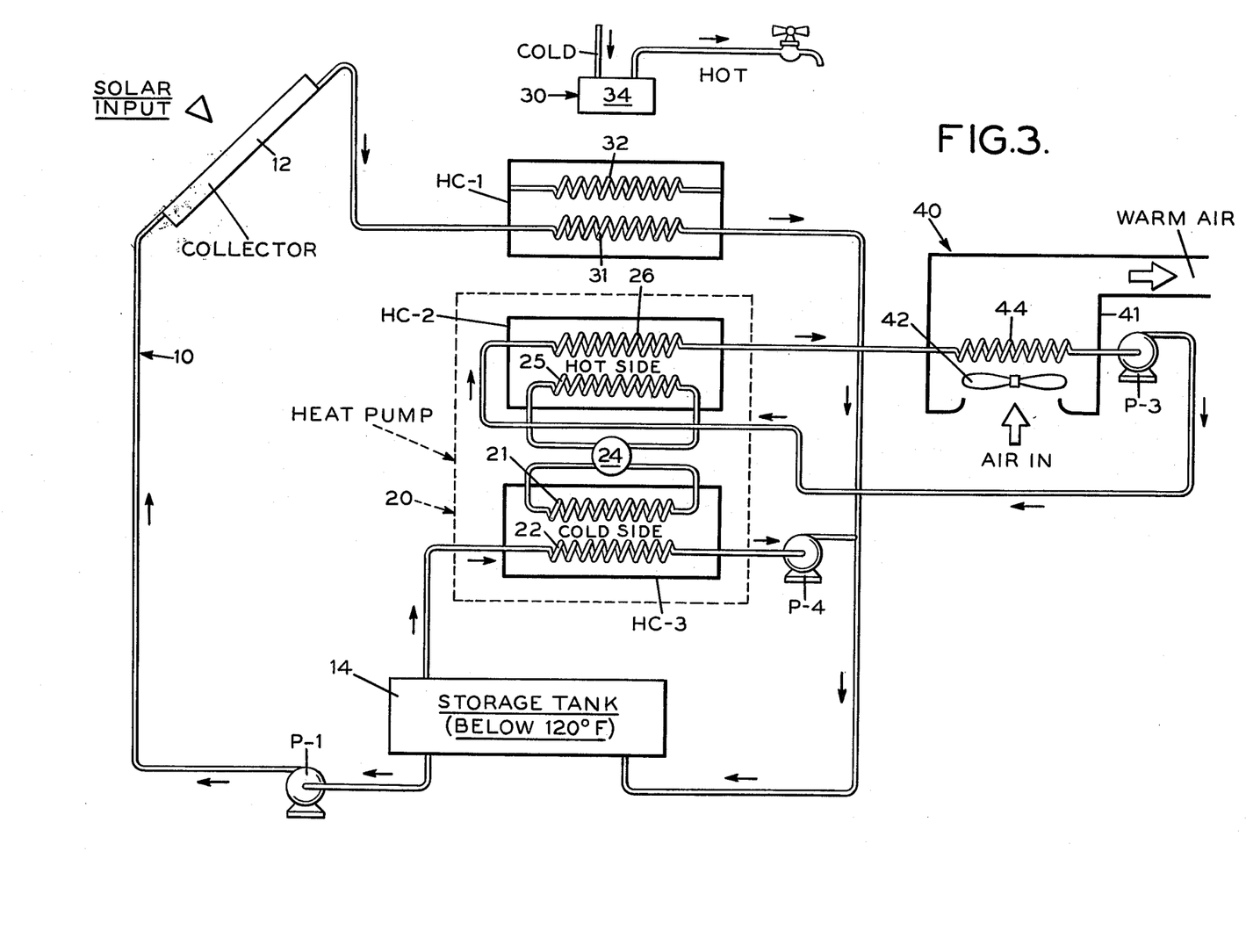
FIG. 3 is a schematic drawing, similar to FIG. 1, showing the operative portions of the system operating to heat room air on an overcast, cool day.

FIG. 3 shows the portions of the system which operate on cloudy cool days or whenever the storage tank temperature drops below 120° F. In this mode of operation heat is extracted from the water stored in tank 14 by the heat pump 20 and is used to raise the temperature of the hot side heat exchanger HC-2 to a temperature appropriate for heating room air in the air handler 40. The solar collector 12 receives a limited, but nevertheless useful, quantity of heat energy which is added to the heat energy in the storage tank 14.

The heat pump 20 operates to cool evaporator coil 21 in the cold side heat exchanger HC-3 and to warm the condenser coil 25 in the hot side exchanger coil HC-2. The evaporator coil 21 extracts heat energy from water circulated by pump P-4 from tank 14 through coil 22 in the cold side heat exchanger HC-3 and back to the tank. The extracted heat energy appears at higher temperature at the condenser coil 25 where that heat is extracted by water circulated by pump P-3 through hot side exchanger coil 26 and thence through coil 44 in air handler 40 wherein room air is heated. Operation in this mode can continue until the heat energy extracted from the tank 14 causes the temperature to drop to about 50° F., at which point the heat pump becomes less efficient without the addition of supplemental heat. Since the temperature in the solar loop 10 is below that required for domestic hot water, hot water heater 34 is operated independently of the system as a conventional water heater.

Figure 4:
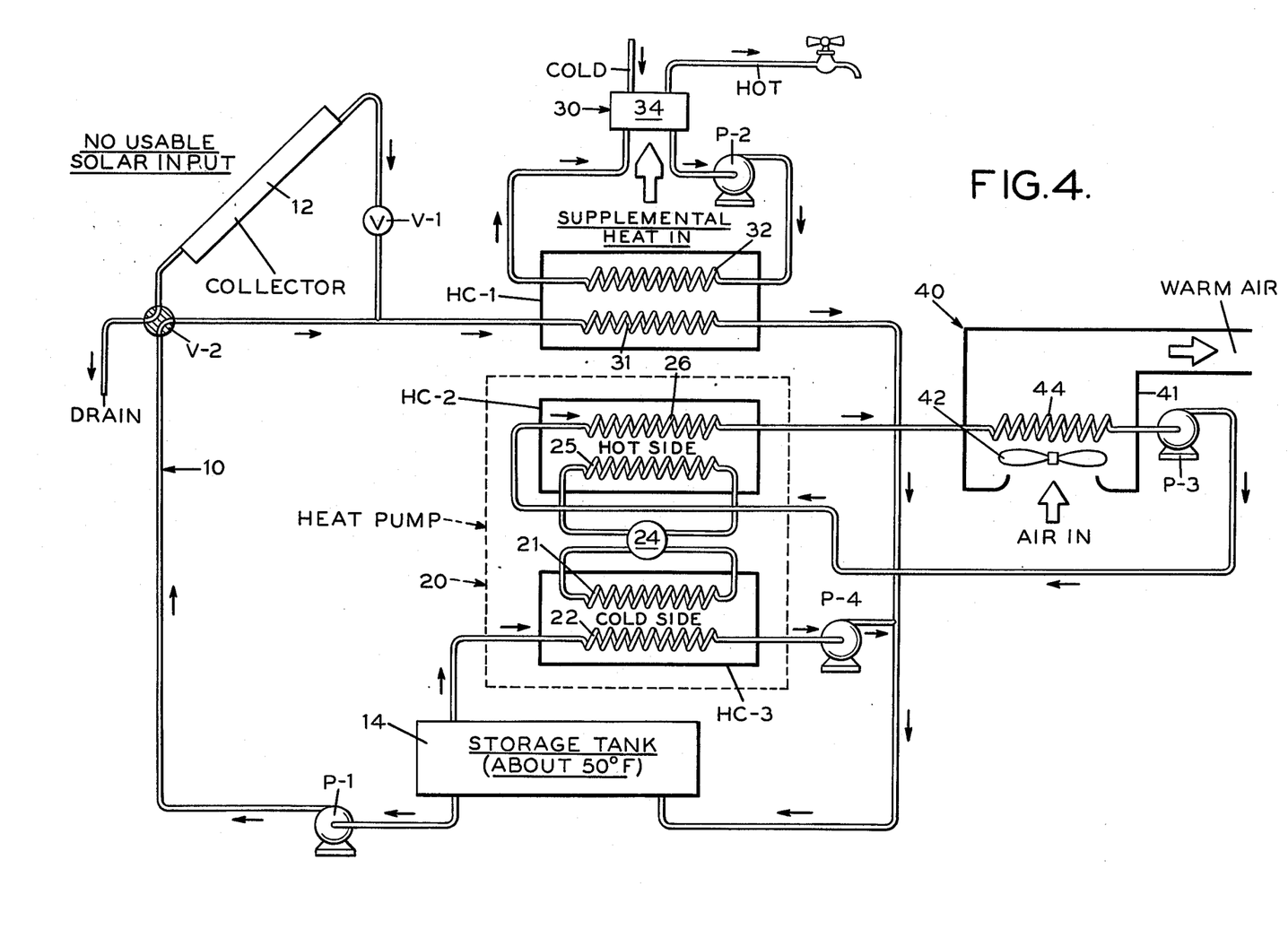
FIG. 4 is a schematic drawing similar to FIG. 1, showing the operative portions of the system operating to heat water and room air after an overcast, cold week.

FIG. 4 shows the operation of the system when the temperature of the water in the storage tank drops to about 50° F., requiring the addition of supplemental heat energy. This condition of depleted stored heat can be reached after a number of cold days with little solar insolation. Since, under these assumptions, the solar collector 12 contributes little energy and may freeze, it can be bypassed and drained using valves V-1 and V-2 which can be automatically operated by temperature and solar insolation sensor activated controls. Alternatively, in the case of an evacuated collector which loses little heat by convection or conduction, a low flow of storage tank water sufficient to avoid freezing can be maintained without significant energy expenditure.

Supplemental heat energy is added to the system at a rate sufficient to maintain the temperature of the storage tank water at about 50° F. by means of the large capacity hot water heater 34. Heated domestic water is circulated by pump P-2 through coil 32 in heat exchanger HC-1 where some of the heat is transferred to coil 31. Storage tank water is circulated through coil 31 of heat exchanger HC-1 and returned to the storage tank 14 by circulation pump P-1. In this way the temperature of the storage tank can be maintained at 50° F. or more as heat is extracted by the heat pump 20 operating to warm room air as was described in connection with FIG. 3.

Although the heat source of the hot water heater 34 can be gas or oil fire, an advantage of electric resistance heating is the low electric rates available during "off-peak" hours at night from many utility companies. Lower cost "off-peak" electric power can be used to warm the water in the storage tank 14 at night when household room air and hot water heat demands are low.

Figure 5:
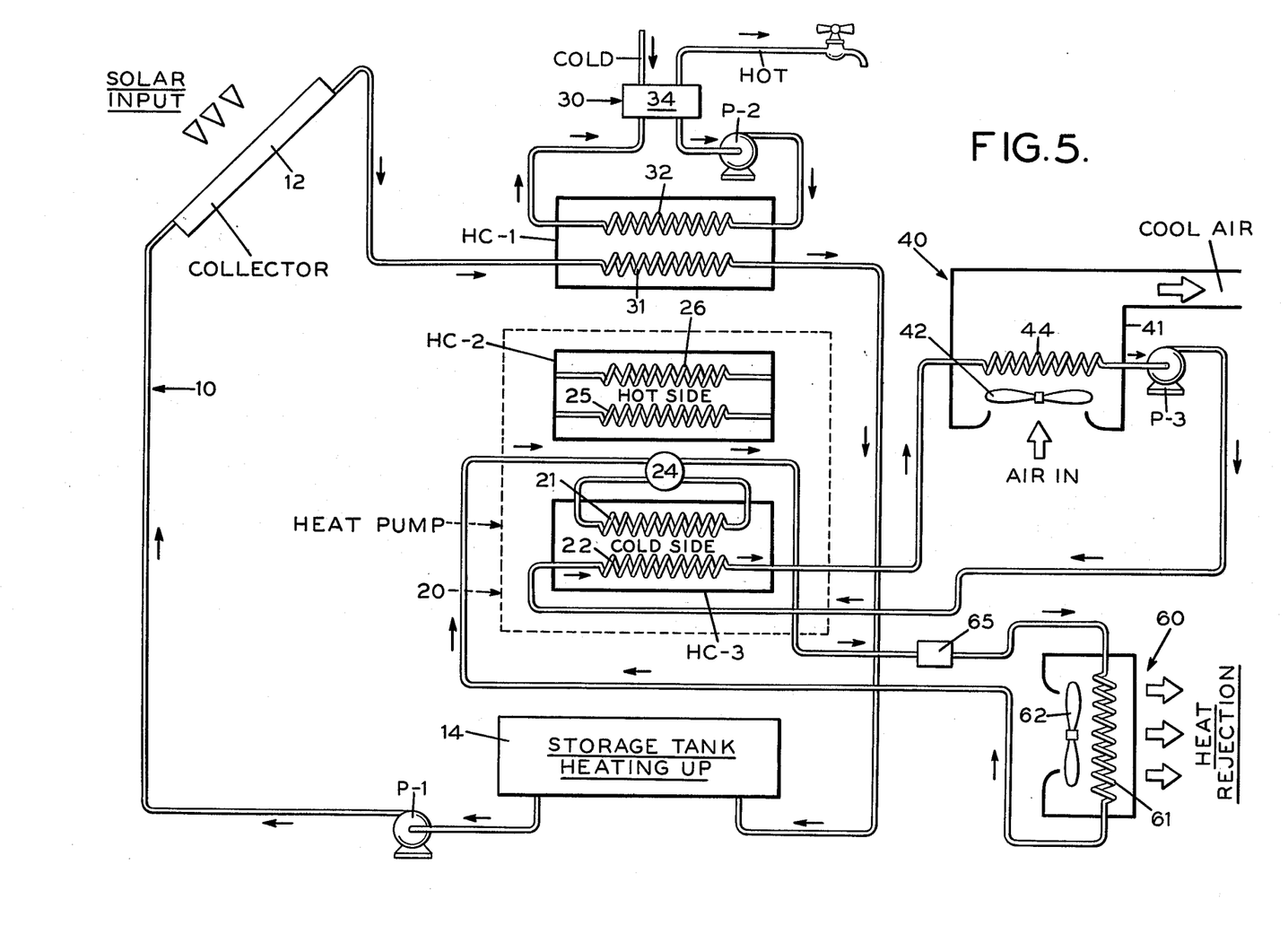
FIG. 5 is a schematic drawing similar to FIG. 1, showing the operative portions of the system operating on a hot day in accordance with FIG. 1 and employing an alternative means of heat rejection.

FIG. 5 schematically illustrates an alternative construction of the system applicable in the air cooling mode illustrated in FIG. 1. In the construction of FIG. 5, the hot, high pressure refrigerant is piped out doors to a refrigeration condenser unit 60 having a condenser coil 61 and fan 62 and is there cooled and returned to the heat pump 20. The construction of FIG. 1 employs water in the heat rejector 50, thus requiring draining during freezing weather. The construction of FIG. 6 does not require draining, but does require a trap 65 to prevent the migration of refrigerant to the outside condenser 61 during cold weather. Trap 65 is a conventional bucket type steam trap such as model 1011½ manufactured by Armstrong Machine Works, Three Rivers, Mich. The trap is placed in the high pressure refrigerant line going to the condenser so as to allow vapor to flow, but to prevent the passage of liquid refrigerent. Refrigerant will liquify in the outside portion of the high pressure line during cold weather and will be blocked by the trap 65 from proceeding to the outside condenser unit 60. In the summer, the refrigerant will be vapor which will freely pass through trap 65.

The system is controlled by appropriately located temperature sensors, solar insolation sensors and adjustable thermostats which, in concert, start and stop the various circulation pumps, fans, the heat pump compressor, and open or close motorized valves to automatically establish the mode of operation appropriate for the weather conditions, the heat demand and the status of the heat energy stored in the tank.

Figure 6:
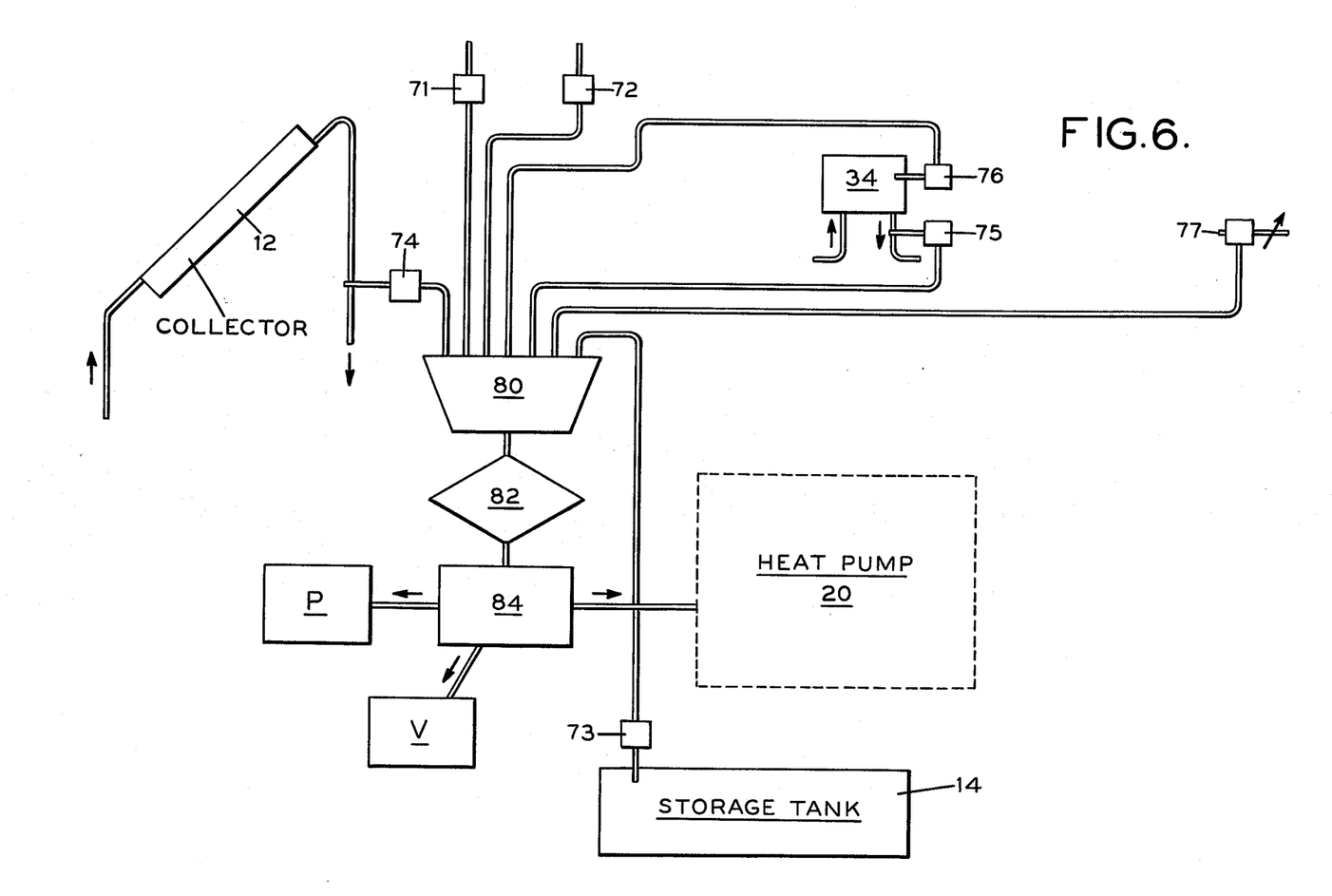
FIG. 6 is a schematic block diagram of the sensors and controls of the system.

FIG. 6 is a simplified schematic diagram of the control system. Solar insolation sensor 71, temperature sensors 72–76 and room air adjustable thermostat 77 each provide information on weather or system conditions in the form of an electrical or pneumatic signals to the control system information input 80. The information is processed by logic circuitry 82 and control decisions are made. The decisions are processed into control signals generated by control circuit 84 which controls the heat pump 20, the various pumps P and the various valves V.

Sensor 71 senses solar insolation and sensor 72 senses ambient temperature. Together with solar loop temperature sensor 74 they provide information used in deciding whether to bypass the collectors, and provide information regarding expected heat demand. Temperature sensor 73 provides information used in controlling the starting and stopping of the heat pump 20 and supplemental heater 34. Temperature sensor 76 is the ordinary hot water heater control which controls supplemental heating for domestic hot water needs. Temperature sensor 75 provides information used to decide whether the hot water circulator pump P-2 should run. Temperature sensor 77 is an ordinary heating and cooling adjustable room thermostat.

Since such sensors, controls, and circuitry are well established in the heating and air conditioning art, further or more detailed description is not thought to be necessary.

For a given home on days having specific ambient temperature and solar insolation conditions, the energy requirements of a conventional space heater (furnace), a conventional heat pump system, and the present system can be compared. For purposes of comparison, the home chosen is a 1500 square foot living space residence in Columbus, Ohio on March 21st with a 15 mph wind. The winter had an accumulated total of 5,660° days.

Assuming an ambient air temperature of 46° F., a relative humidity of 70%, a bright day solar insolation of 2,162 BTU/ft$^2$/day and a room temperature of 70° F. results in heat loss of about 11,000 BTU/hr. This represents an energy purchase to provide in the house the equivalent of 79.3 KWH/day for a conventional space heater such as a furnace. A conventional heat pump operating from a heat source such as ambient air, requires the purchase of 44.1 KWH/day. The present system, would under these conditions, require purchase of only 6.0 KWH/day to operate pumps, etc. since the solar collector would provide an adequate flow of water to fulfill air heating requirements.

If the ambient condition assumptions are altered to the same 46° temperature, but a cloudy day having a solar insolation of 324 BTU/ft$^2$/hr., the conventional space heater would require the same 79.3 KWH/day, the conventional heat pump would require the same 44.1 KWH/day and the present system would require the purchase of 20.2 KWH/day including 6.7 KWH/day for pumps, etc. to elevate the temperature of the water circulated from the tank to a temperature useable for space heating.

Assuming the same conditions as in the previous example, but further assuming that cloudy weather has persisted, will result in the same energy requirements as the previous example for the conventional space heater and conventional heat pump. Because the energy stored in the water in the storage tank of the present system has been depleted, supplemental heat input is required to maintain the temperature of the stored water. Consequently the total energy required by the present system will be 74.1 KWH/day of which 6.7 KWH/day is for pumps, etc. and 67.4 is for supplemental heat and the heat pump.

The foregoing data is tabulated below.

Table I

| Solar Radiation | Conventional Space Heater | Conventional Heat Pump | Present System |
|---|---|---|---|
| (Bright) | 79.3 KWH/day | 44.1 KWH/day | 6.0 KWH/day |
| Cloudy day (using stored energy) | 79.3 KWH/day | 44.1 KWH/day | 20.2 KWH/day |
| Cloudy day (stored energy depleted) | 79.3 KWH/day | 44.1 KWH/day | 74.1 KWH/day |

The following is a comparison similar to that above, but for a January 21st having constant ambient conditions of 20° F., 15 mph wind and a room temperature of 70° F. This comparison uses a bright day solar insulation of 1,810 BTU/ft$^2$/day and a cloudy day insolation of 271.5 BTU/ft$^2$/day. This represents a heat load of the equivalent of 165.8 KWH/day.

Under the conditions of a bright day, a cloudy day using stored energy, and a cloudy day when the stored energy has been depleted, both the conventional space heater and a home with a heat pump require 165.8 KWH/day. These systems are identical because a conventional heat pump system can not be used at 20° F. and must rely upon other heating means.

With the system of the present invention, bright day solar insolation contributes 66.3 KWH/day leaving a balance of 99.5 KWH/day to be supplied. Assuming that the energy stored in the tank is kept constant by purchase of the needed 99.5 KWH/day, the energy purchased is 99.5 KWH/day of which 19.9 KWH/day is used to run the heat pump unit, plus an additional 6.7 KWH/day for circulation pumps for a total of 106.2 KWH/day. If the energy stored in the tank is used and not replaced, the total for the day is 26.6 KWH/day.

On the cloudy day the solar insolation contribution is 9.9 KWH/day for a net requirement of 155.9 KWH/day. Assuming that the stored energy in the tank is used, the total energy purchased is 46.9 KWH/day for the heat pump and associated pumps.

If cloudy days persist there will be no more stored energy available, therefore all must be purchased. The total purchased requirement is 164.1 KWH/day of which 42.8 KWH/day is for the heat pump and associated pumps.

The following table presents this data:

Table II

| Solar Radiation | Conventional Space Heater | Conventional* Heat Pump | Present System |
|---|---|---|---|
| Bright | 165.8 KWH/day | 165.8 KWH/day | 106.2 KWH/day (26.6 KWH/day using stored energy) |
| Cloudy day (using stored energy) | 165.8 KWH/day | 165.8 KWH/day | 46.9 |
| Cloudy day (stored energy depleted) | 165.8 KWH/day | 165.8 KWH/day | 164.1 |

*At 20° F ambient, a conventional heat pump will not operate Consequently, all heat input must be from a source such as conventional furnance or resistance heaters.

From the foregoing data it is apparent that conventional space heating requires the purchase of the most energy and the system of the present invention requires the least.

The system of the present invention thus is very economical when compared with conventional space heating or with conventional heat pump systems. It is only after a cloudy period which exhausts the stored energy that other systems become competitive. Most days of the winter heating season will provide useful quantities of solar heat so that on a seasonal basis, the present system is vastly superior to other heating systems. Since the system of present invention has the capability of storing heat energy, much of the energy which has to purchased can be acquired at lower cost "off-peak" rates. Thus, because of "off-peak" rate advantages, the kilowatthours used to compare systems are not directly comparable in terms of cost.

The system can be optimized for a particular climate, residence size, and utility rate schedule by increasing or decreasing the solar collector capacity, tank storage capacity, supplemental heat capacity and heat pump capacity. Advantage can be taken of "off-peak" lower power costs to purchase energy at lower cost periods to be stored in the tank for use during higher cost periods.

What is claimed is:

1. A system for temperature conditioning room air and domestic hot water comprising a liquid circulation loop including solar collector means to transfer solar energy to the liquid, means to exchange heat between the liquid and room air, means to store the liquid, means to circulate the liquid through the loop, and means to exchange heat with a domestic hot water supply comprising a heat exchanger having a first coil in said liquid circulation loop and a second coil in heat exchange relationship with said first coil, said second coil being in a domestic hot water circulation loop which also includes domestic hot water storage means and means to circulate domestic hot water through the loop.

2. The system of claim 1 including heat pump means for establishing a temperature differential between a hot side and a cold side, said heat pump means including a refrigerant compressor, an evaporator on the cold side, and a condenser on the hot side, and liquid circulation means for transferring heat between said room air heat exchange means and said condenser or said evaporator.

3. A system for heating or cooling room air and heating domestic hot water comprising;
   (a) a solar energy extractor comprising solar collector means for heating a liquid, means for storing the liquid, conduit means for connecting the solar collector means and storage means to form a solar energy circulation loop, and means to circulate the liquid about the loop,
   (b) heat pump means for establishing a temperature differential between a hot side and a cold side, said heat pump means including a refrigerant compressor, an evaporator on the cold side, and a condenser on the hot side,
   (c) cold side heat exchanger means for transferring heat between the evaporator and a cold side liquid circulation loop,
   (d) hot side heat exchanger means for transferring heat between the condenser and a hot side liquid circulation loop,
   (e) heat exchanger means for transferring heat between the solar energy circulation loop and a domestic hot water circulation loop,
   (f) room air heat exchanger means for transferring heat between room air and any one of said solar energy, hot side and cold side liquid circulation loops,
   (g) external heat exchanger means for rejecting heat from said heat pump hot side to the external environment,
   (h) supplemental heating means in said domestic hot water circulation loop,
   (i) means to selectively connect one of said solar energy, hot side, or cold side liquid circulation loops with said room air heat exchanger means,
   (j) means to selectively connect said external heat exchanger means to said heat pump hot side, and
   (k) control means responsive to heat demand, weather and system conditions to effect said selective connections, to control the supplemental heating means, and to control said heat pump means.

4. A system for heating or cooling room air and heating domestic hot water comprising;
   (a) a solar energy extractor comprising solar collector means for heating a liquid, means for storing the liquid, conduit means for connecting the solar collector means and storage means to form a solar energy circulation loop, and means to circulate the liquid about the loop,
   (b) heat pump means for establishing a temperature differential between a hot side and a cold side, said heat pump means including a refrigerant compressor, an evaporator on the cold side, and a condenser on the hot side,
   (c) cold side heat exchanger means for transferring heat between the evaporator and a cold side liquid circulation loop,
   (d) hot side heat exchanger means for transferring heat between the condenser and a hot side liquid circulation loop,
   (e) heat exchanger means for transferring heat between the solar energy circulation loop and a domestic hot water circulation loop,
   (f) room air heat exchanger means for transferring heat between room air and any one of said solar energy, hot side and cold side liquid circulation loops,
   (g) external heat exchanger means for rejecting heat from said heat pump hot side to the external environment,
   (h) means to selectively connect one of said solar energy, hot side, or cold side liquid circulation loops with said room air heat exchanger means,
   (i) means to selectively connect said external heat exchanger means to said heat pump hot side, and
   (j) control means responsive to heat demand, weather, and system conditions to effect said selective connections and to control said heat pump means.

5. A system for heating or cooling room air comprising;
   (a) room air heat exchanger means to exchange heat between room air and circulating liquid,
   (b) heat pump means for establishing a temperature differential between a hot side and a cold side, said heat pump means including a refrigerant compressor, an evaporator on the cold side, and a condenser on the hot side,
   (c) cold side heat exchanger means for transferring heat between the evaporator and a cold side liquid circulation loop,
   (d) hot side heat exchanger means for transferring heat between the condenser and a hot side liquid circulation loop,
   (e) means for selectively connecting one of said hot side and cold side liquid circulation loops with said room air heat exchanger means.

6. The system of claim 5 including a solar heated liquid circulation loop including solar collector means to transfer solar energy to the liquid, means to store the liquid, and means to circulate the liquid, said cold side liquid circulation loop being selectively included in said solar heated liquid circulation loop.

7. The system of claim 6 including means for transferring heat between said solar heated liquid circulation loop and a domestic hot water circulation loop.

8. The system of claim 7 including means to heat water in said domestic hot water circulation loop and to provide supplemental heating of liquid in said solar heated liquid circulation loop.

9. The system of claim 6 including liquid storage means and means for selectively connecting said liquid storage means with either of said liquid storage loops.

10. The system of claim 9 including means to provide supplemental heating of the liquid in said storage means.

11. The system of claim 5 including external heat exchanger means for rejecting heat to the external environment from the hot side of said heat pump means.

12. The system of claim 11 wherein the external heat exchanger means is a refrigerent vapor condenser.

13. The system of claim 12 including means to permit the flow of refrigerant vapor and to prevent the flow of refrigerant liquid to the external heat exchanger.

14. The system of claim 13 wherein the means to permit the flow of vapor is a steam trap in the refrigerant line leading to an external refrigerant condenser.

15. The system of claim 5 including liquid storage means and means for selectively connecting said liquid storage means with either of said liquid circulation loops.

16. The system of claim 15 including means to provide supplemental heating of the liquid in said storage means.

* * * * *